June 22, 1954 — L. L. HUGHES — 2,681,778
FUEL STORAGE SYSTEM FOR AIRCRAFT
Filed Sept. 29, 1950 — 2 Sheets-Sheet 1
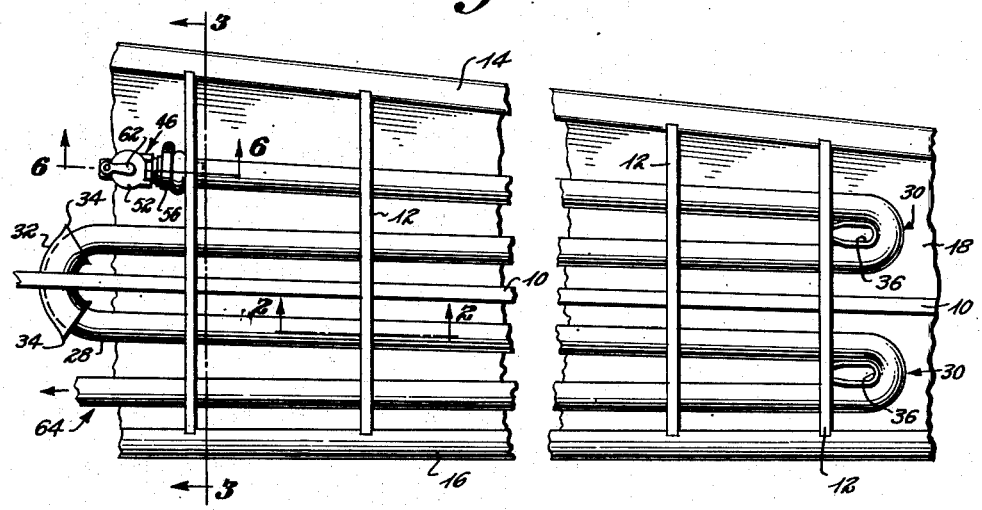
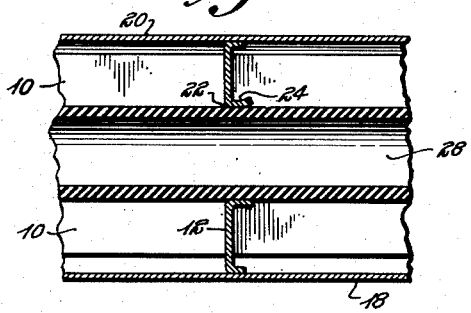
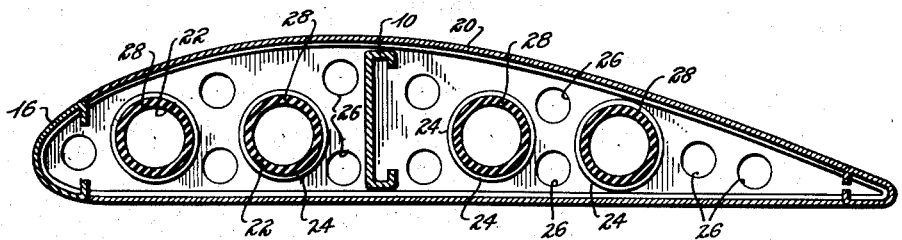
INVENTOR
Landrum L. Hughes
BY
Bacon & Thomas
ATTORNEYS June 22, 1954 — L. L. HUGHES — 2,681,778
FUEL STORAGE SYSTEM FOR AIRCRAFT
Filed Sept. 29, 1950 — 2 Sheets-Sheet 2

INVENTOR
Landrum L. Hughes
BY
Bacon & Thomas
ATTORNEYS

Patented June 22, 1954

2,681,778

UNITED STATES PATENT OFFICE 2,681,778

FUEL STORAGE SYSTEM FOR AIRCRAFT

Landrum L. Hughes, Oklahoma City, Okla.

Application September 29, 1950, Serial No. 187,569

5 Claims. (Cl. 244—135)

This invention relates to fuel storage systems particularly adapted for use in aircraft and particularly directed to a fuel storage system for holding fuels normally maintained in the liquid state only under relatively high pressures.

The fuel storage system of the present invention contemplates an arrangement providing a storage space adapted to hold liquefied fuels such as butane, which must be maintained under relatively high pressures to be kept in a liquid state. The invention comprises generally, a storage tank consisting of a relatively small diameter flexible tube constructed with sufficient wall strength to resist the pressures employed and arranged to extend longitudinally of an aircraft wing with a plurality of longitudinally extending portions arranged side-by-side to provide the necessary capacity. The longitudinally extending portions preferably extend throughout a major portion of the length of the wing and are relatively uniformly distributed over the chordal plane of the wing.

A number of advantages accrue from the employment of such a system, such as, the ability of the flexible tube to withstand fuel pressures without the necessity of providing an extremely strong metallic tank and the ability of the fuel storage system to flex or bend upon distortion of the wing and thereby eliminate the danger of rupturing the storage space and creating an immediate fire hazard.

It is, therefore, an object of this invention to provide a fuel storage system to adapt liquefied butane or the like to aircraft use.

It is a still further object of this invention to provide a flexible fuel storage system highly resistant to rupture upon deflection of its supporting structure.

Still another object of the invention is to provide a fuel storage system for aircraft wherein the weight of the fuel is substantially uniformly distributed throughout the entire wing area.

Additional objects and advantages will become apparent to those skilled in the art as the description proceeds in connection with the accompanying drawings, wherein:

Fig. 1 is a plan view of an aircraft wing embodying the present invention with the upper covering of the wing removed and portions of the wing broken away;

Fig. 2 is a sectional view taken substantially along the line 2—2 of Fig. 1, showing the parts on an enlarged scale;

Fig. 3 is a sectional view taken substantially along the line 3—3 of Fig. 1, on a slightly enlarged scale;

Figure 4:
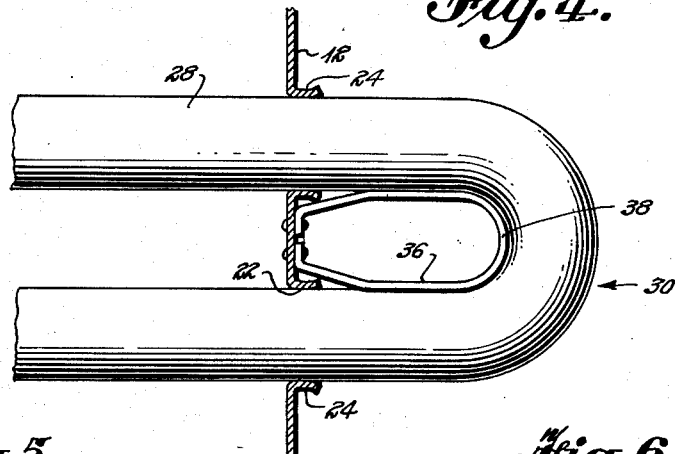
Fig. 4 is a fragmentary horizontal sectional view taken substantially through the mid portion of a rib at the right-hand end of Fig. 1.

The arrangement shown in Fig. 1 represents an aircraft wing structure having a longitudinally extending spar or beam 10 and a plurality of ribs 12 extending transversely of the wing and the spar 10. Suitable rigid frame members 14 and 16, constituting trailing and leading edge members, respectively, may be attached to the foremost and rearmost ends of the ribs 12 to unite the wing frame into a unitary structure.

Conventionally, the wing is provided with a lowermost surface defined by a skin or cover member 18 and an uppermost skin or cover member 20 (not shown in Fig. 1).

In the modification of Fig. 1, each of the ribs 12 is provided with a plurality of openings 22 (see Figs. 2 and 3) extending therethrough. Each of the openings 22 is preferably provided with a flange 24 defining the periphery thereof. The ribs may be provided with additional openings 26, if desired, to reduce the weight of the structure, as is conventional. The structural features of the wing frame constitute no part of the present invention and may be modified in any way desired. According to the present invention, an aircraft wing provided with transverse partition members is adapted to accommodate the fuel storage means of the present invention by the provision of openings 22 through the partition members.

An elongated flexible hollow hose or tube 28 is threaded through the openings 22 in the ribs and arranged in a sinuous manner, as shown in Fig. 1, with substantially straight portions extending throughout a major part of the length of the wing. Adjacent the ends of the wing, the tube or hose 28 is reversely bent as at 30, to effect the sinuous arrangement described. To accomplish a sinuous arrangement with the tube distributed over substantially the entire chordal plane of a wing having such a longitudinal spar as shown at 10, it is necessary that at least a portion of the tube 28 pass through that spar. The spar may be provided with an opening at the place where it is desired to have the tube 28 pass therethrough, and a curved tubular structure 32 may extend through the opening in the spar and embrace the curved portion of the hose or tube 28. Preferably, the member 32 will be of rigid material such as metal and provided with flared ends 34 to prevent too sharp a bend in the tube 28 and prevent abrasion or scuffing of the tube by the edges of the openings through the spar 10.

At the ends of the sinuous arrangement where the tube 28 is reversely bent, as at 30, sustaining or supporting members 36 are preferably provided to prevent too sharp a bend in the tube and to prevent "sagging" of the unsupported portion of the longitudinally extending portions of tube 28. The members 36 may be in the form of brackets, riveted or otherwise attached to an adjacent rib 12 and positioned between adjacent openings 22 through that rib.

The brackets 36 are provided with a substantially cylindrical wall portion 38 abutting the concave side of the curved portion of tube 28. The tube 28, when arranged in the manner indicated in Fig. 1, will preferably be placed in tension to assist in sustaining the weight of the fuel therein between the ribs 12 and prevent sagging of those portions of the tube. Preferably, the tube 28 is of an outer diameter substantially equal to the inner diameter of the openings 22 to maintain the tube against lateral movements that may be induced by vibrations in the wing structure.

Figure 5:
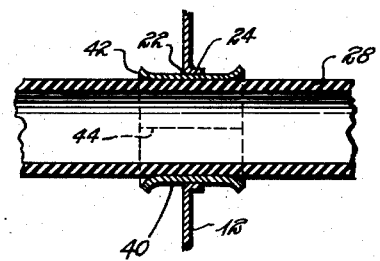
Fig. 5 is a fragmentary sectional view similar to Fig. 2, but showing a modified form of construction.

Under certain circumstances, the flange 24 about the openings 22 may not be of sufficient area to properly support the tube 28 and prevent abrasion thereof. In such circumstances, the modified structure shown in Fig. 5 may be employed. In Fig. 5, the openings 22 support a tubular member 40 extending therethrough and provided with flared end portions 42. The tubular members 40 are of an outer diameter such that they are securely held in the openings 22 without lateral play. If desired, tubular members 40 may be constructed as a plurality of complementary parts having abutting edges as at 44, whereby the several elements may be separately inserted in the openings 22. Such construction is particularly desirable where the flared ends 42 are provided since the tube 40, having flared ends thereon, could not be inserted as a unit in the opening 22.

One end of the tube or hose 28 is provided with a fitting 46 (see Figs. 1 and 6) comprising a tubular section 48 receivable within the end of the hose 28, and a laterally bent end 50 provided with a hinged cover 52. The tubular portion 48 may be provided with an integral circumferential rib 54 over which the tube or hose 28 is drawn.

Figure 6:
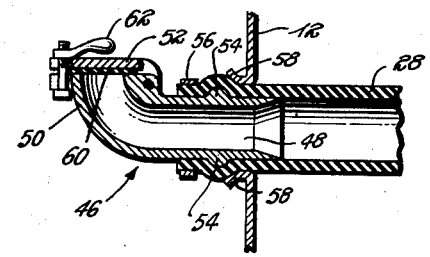
Fig. 6 is a detailed sectional view taken on the line 6—6 of Fig. 1, with the parts shown on an enlarged scale.

A suitable clamp 56 compresses the end of the tube 28 about the tubular portion 48 to affix the fixture 46 thereto. Preferably, the rib 54 and the resulting bulged portion of the hose 28 are positioned adjacent a reversely curved flange 58 in a rib 12 to thereby affix the end of the tube 28 against movement to the right, as seen in Figs. 1 and 6. By this arrangement, a longitudinally extending portion of hose 28 terminating in the fixture 46 may be maintained under the required tension previously discussed.

The hinged cover 52 of the fixture 46 has a gasket 60 carried by its undersurface and a suitable locking or clamping means 62 enables the cover to be tightly clamped to the end of the fixture to seal the end of the tube or to be opened for filling of the tube with the liquefied fuel employed. An access door will, of course, be provided in the upper surface of the wing over the fixture 46 to render the same accessible for refueling the airplane.

The tube or hose 28 may be of any suitable construction and may be a conventional hose as presently employed for conveying liquid butane. Such a hose has relatively thick flexible walls reinforced by suitable woven or braided fibrous material (not shown). It is only necessary that the hose 28 be constructed to withstand the pressure generated within a space containing liquid butane. If desired, the hose 28 may be armored to render it resistant to penetration by bullets or the like, or may be provided with a self-sealing composition as is commonly employed in aircraft fuel tanks at the present time.

The other end of tube 28, indicated at 64 in Fig. 1, may be connected to any suitable stationary fixture through which fuel may be drawn and conveyed to the engine of the craft. Since the liquid fuel contemplated by applicant is that commonly known as "liquid petroleum" gas and is maintained in the liquid state at normal temperatures only by being confined under high pressure, no vent in the fuel storage system is necessary. The liquid vaporizes readily as it is withdrawn and supplies vapors under pressure to replace the liquid withdrawn from the storage tube. Furthermore, the pressure existing in the tube forces the liquid fuel to the engine regardless of the attitude of the airplane and without the necessity of providing a fuel pump.

It will be seen that the arrangement described provides a fuel storage system capable of holding fuels under relatively high pressures without an undue increase in the weight of the container. It will be apparent that the strength of such a relatively small diameter tube can be made quite great, whereas a large tank would have to be quite ruggedly constructed and of considerable weight to retain such pressures. It will further be apparent that the arrangement described distributes the weight of the fuel substantially uniformly over the entire wing area and provides a fuel storage system highly resistant to rupture in the event of a collision resulting in distortion or bending of the wing frame. This latter feature is of particular advantage in that the fire hazard which usually follows a crash is largely eliminated.

Figure 7:
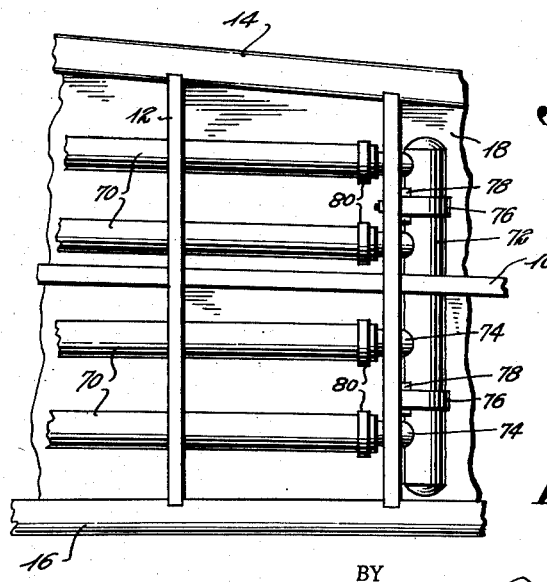
Fig. 7 is a fragmentary plan view similar to the right-hand portion of Fig. 1, but showing a modified form of the invention.

In the embodiment of the invention shown in Fig. 7, the wing frame structure is identical to that described in connection with Figs. 1 to 6, but instead of using a single continuous length of flexible hose, a plurality of individual tubes 70 are employed. Each flexible tube 70 is of the same construction as the tube 28 previously described, and each is of a length equal to the major portion of the length of the wing. A transverse header 72, comprising a hollow container having laterally extending nipples 74 is fixedly mounted within the wing of the airplane with the nipples 74 preferably extending through openings in an adjacent rib 12. The container or header 72 may be held in fixed position within the wing by means of clamping bands 76 holding it against suitable blocks 78. A nipple 74 is provided for each of the tubes 70 and extends thereinto. Suitable clamps 80 surround the tubes 70 where they embrace the nipples 74 and clamp the tubes to the header in fuel-tight relationship. A suitable header similar to that described is also provided at the opposite ends of the flexible tubes 70. Preferably, the header at the other end (not shown) will be provided with a suitable fitting for withdrawal of fuel from the system and with a fitting through which fuel may be introduced. The modification shown in Fig. 7 has all of the advantages of that described in connection with Figs. 1 to 6, inclusive, and has the further advantage that it is not subject to vapor-lock. All of the fuel may be withdrawn without the necessity of manipulating the aircraft to change its attitude, for causing flow of fuel to the withdrawing fixture.

While a limited number of embodiments have been shown and described herein, it is to be understood that the invention is not limited thereto but encompasses all modifications falling fairly within the scope of the appended claims.

I claim:

1. A fuel storage system for an airplane having a wing provided with a plurality of longitudinally spaced transverse ribs therein, comprising: a plurality of openings through each of said ribs, an elongated hollow flexible tube sinuously arranged within said wing and having substantially straight portions threaded through the said rib openings and extending longitudinally of said wing, a movable closure mounted on one end of said tube for closing the same, the other end of said tube being positioned at a location accessible for withdrawal of fuel therethrough.

2. A fuel storage system for an airplane having a wing, comprising: an elongated hollow flexible tube sinuously arranged within said wing and having substantially straight portions extending longitudinally of said wing and curved portions joining adjacent straight portions at their ends, means fixed to said wing and engaging and holding said curved portions in fixed relation to said wing, said fixed means being spaced apart as to maintain said substantially straight portions under tension.

3. A fuel storage system as defined in claim 2, including additional means fixed to said wing and engaging and holding said tube at spaced points along said substantially straight portions.

4. A fuel storage system for an airplane having a wing provided with a plurality of transverse ribs therein, comprising: a plurality of flanged openings through each rib, an elongated hollow flexible tube sinuously arranged in said wing and having one end closed and fixed to a portion of said wing, said tube having portions extending longitudinally of said wing and through said flanged openings in adjacent ribs, each of said longitudinally extending portions having an end portion adjacent an end portion of another longitudinally extending end portion, said tube having a curved portion, said adjacent end portions being respectively joined to opposite ends of said curved portion, said curved portion extending around a fixed curved surface carried by said wing, said longitudinally extending portions being held under tension.

5. A fuel storage system for an airplane having a hollow wing, comprising: a plurality of substantially straight portions of hollow and freely flexible tubing extending longitudinally of said wing in generally parallel relation, each of said portions extending throughout a major portion of the length of said wing, said portions being substantially uniformly spaced and distributed across a major portion of the chordal plane of said wing; means joining the interiors of said straight portions, at the ends thereof whereby all of said portions define a single fuel storage chamber, a filling opening in one of said portions, and sealable closure means movably mounted on said one portion to close said opening.

References Cited in the file of this patent

UNITED STATES PATENTS

| Number | Name | Date |
|---|---|---|
| 1,311,076 | Johnson | July 22, 1919 |
| 1,650,346 | Hall | Nov. 22, 1927 |
| 1,865,859 | Jacobs | July 5, 1932 |
| 1,876,620 | Crossland | Sept. 13, 1932 |
| 2,041,450 | Adams | May 19, 1936 |
| 2,105,307 | Akerman | Jan. 11, 1938 |
| 2,110,731 | Horrocks | Mar. 8, 1938 |
| 2,138,970 | Jones | Dec. 6, 1938 |
| 2,403,749 | O'Neal | July 9, 1946 |
| 2,414,909 | Snyder | Jan. 28, 1947 |
| 2,474,974 | Fulton, Jr., et al. | July 5, 1949 |

FOREIGN PATENTS

| Number | Country | Date |
|---|---|---|
| 398,244 | Great Britain | Sept. 11, 1933 |
| 462,904 | Great Britain | Mar. 15, 1937 |